Figure 15:
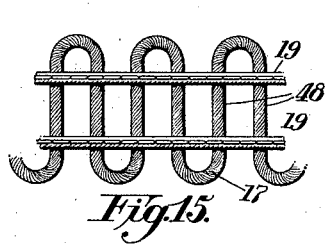

March 16, 1937. J. D. KARLE 2,074,264
MEANS FOR MAKING TRIMMING STRIPS
Filed March 3, 1934 3 Sheets-Sheet 1
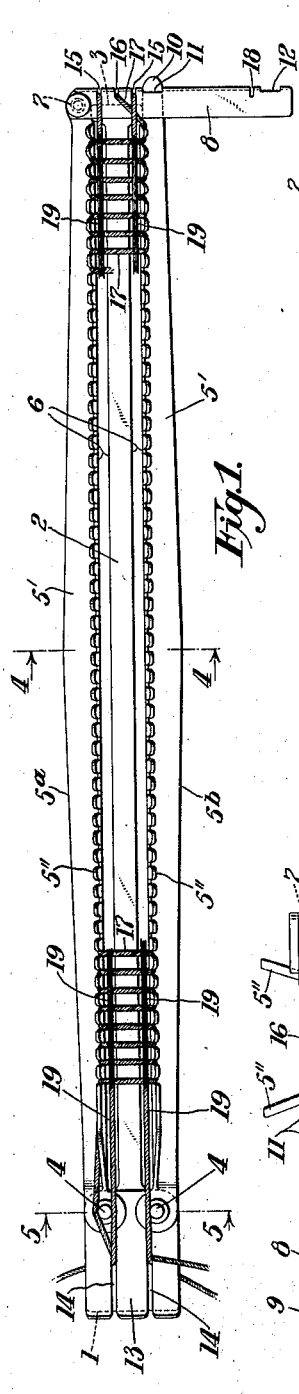
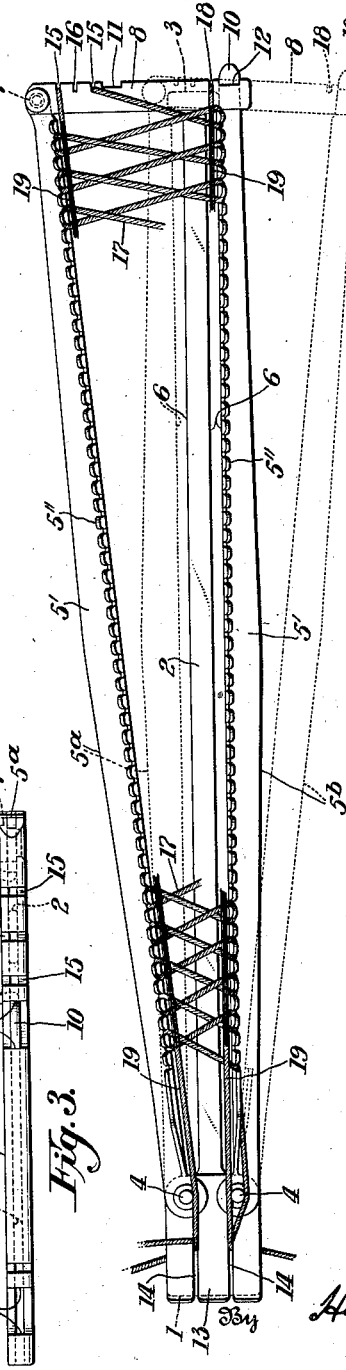
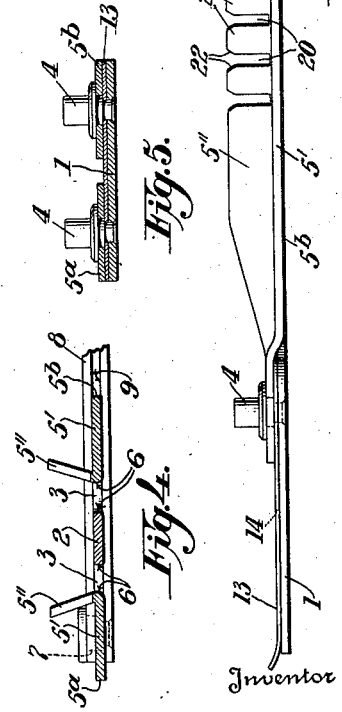
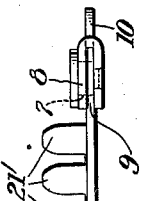
Inventor
John D. Karle March 16, 1937.  J. D. KARLE  2,074,264
MEANS FOR MAKING TRIMMING STRIPS
Filed March 3, 1934  3 Sheets-Sheet 2
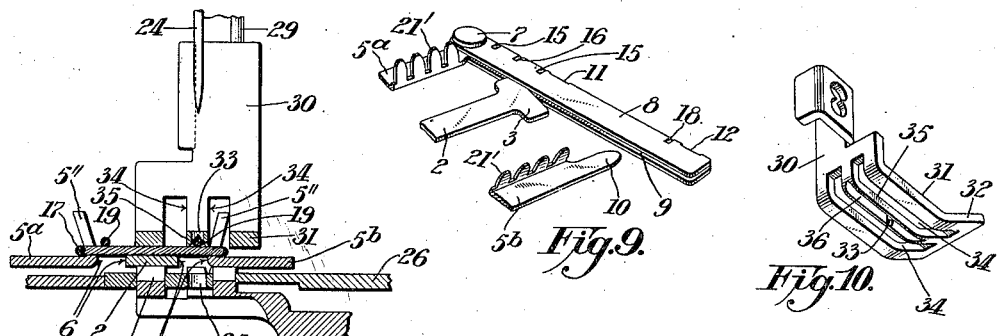
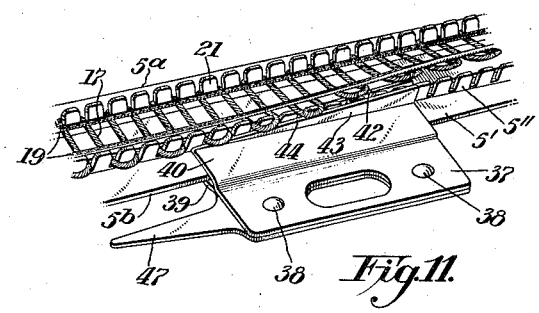
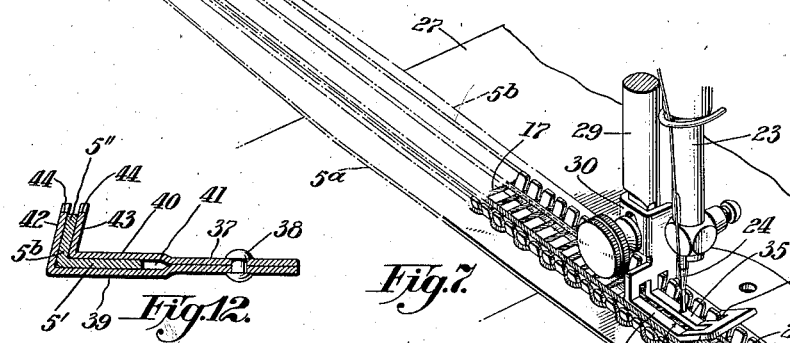
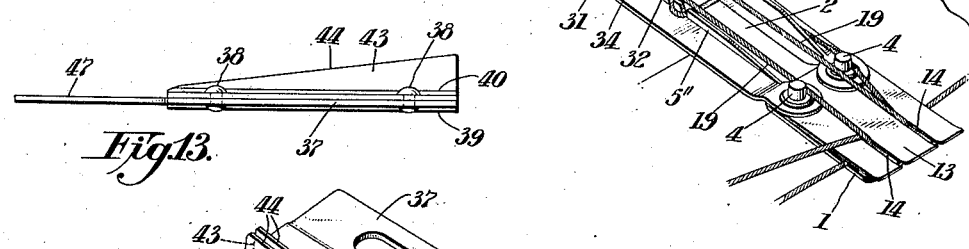
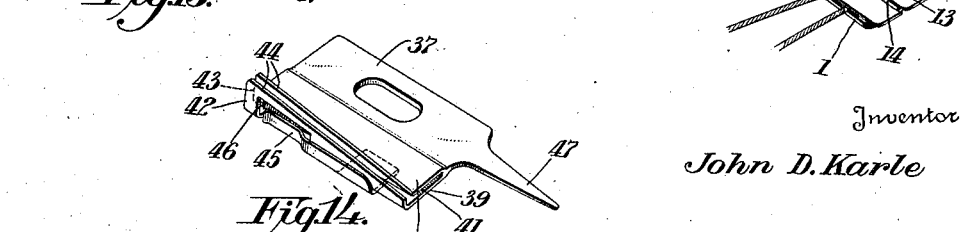
Inventor
John D. Karle March 16, 1937.  J. D. KARLE  2,074,264
MEANS FOR MAKING TRIMMING STRIPS
Filed March 3, 1934   3 Sheets-Sheet 3

Inventor
John D. Karle

Patented Mar. 16, 1937

2,074,264

UNITED STATES PATENT OFFICE 2,074,264

MEANS FOR MAKING TRIMMING STRIPS

John D. Karle, Roselle Park, N. J., assignor to The Singer Manufacturing Company, Elizabeth, N. J., a corporation of New Jersey Application March 3, 1934, Serial No. 713,843

21 Claims. (Cl. 112—9)

This invention relates to trimmings, edgings, and like materials of the type known as fagoting and commonly used by workers in the needlecraft arts for the adornment of articles of wearing apparel and stitched household draperies, linens, etc.

The invention has for an object to provide an ornamental trimming or fagoting strip which may be readily made in any desired length in a variety of patterns by an unskilled person with the aid of a simple hand forming frame used in conjunction with a household sewing machine.

Another object of the invention is to provide a trimming strip of openwork formation which may, without distortion, be readily and accurately guided to the needle of a sewing machine in the attachment of the trimming strip to fabric material, either as a surface ornamentation, as an edging, or as an insertion.

A further object of the invention is to provide a hand forming frame for use with a sewing machine in the production of a wide variety of patterns of openwork trimming or fagoting of the character above referred to.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

It is to be understood that the term "strand" is used herein in a broad sense including any narrow strip-like material, such as tape, ribbon, cord, thread or yarn, of woven, knitted, braided or twisted texture.

In the accompanying drawings, Fig. 1 is a top plan view of a trimming strip forming frame or fork embodying the invention, such frame being adjusted for the formation of trimmings of uniform width or with parallel edges. Fig. 2 is a similar view with the frame adjusted for the formation of tapered trimmings. Fig. 3 is an enlarged end view of the device in the position of adjustment shown in Fig. 1. Figs. 4 and 5 are, respectively, sections on the lines 4—4 and 5—5, Fig. 1. Fig. 6 is an enlarged side elevation of the device shown in Fig. 1. Fig. 7 is a perspective view of the device as used in conjunction with a sewing machine. Fig. 8 is a transverse section through the device at the stitching point in a sewing machine. Fig. 9 is a perspective view of the free end of the device in opened condition.

Figure 17:
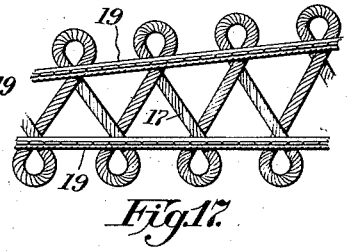
Figure 18:
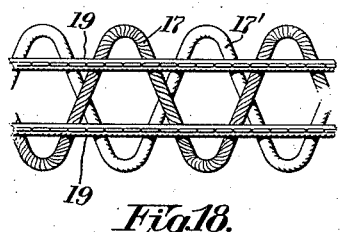
Figure 19:
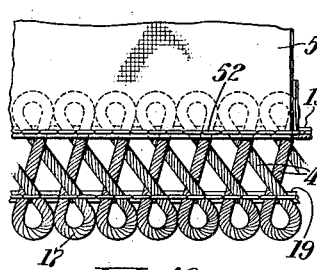
Figure 20:
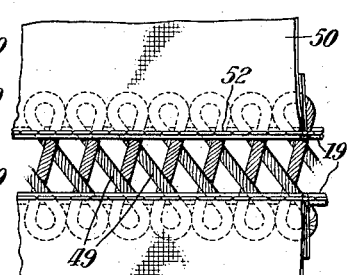
Figure 21:
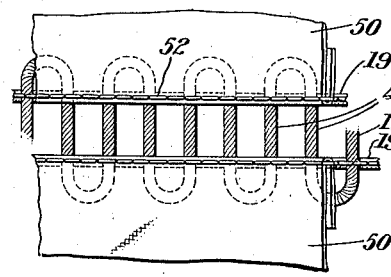
Figure 23:
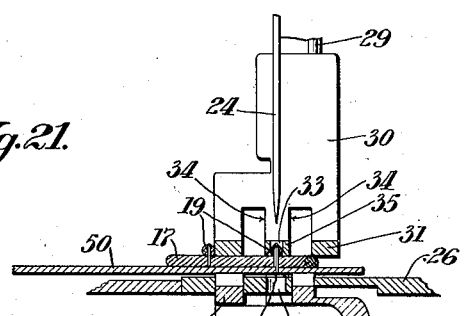
Figure 22:
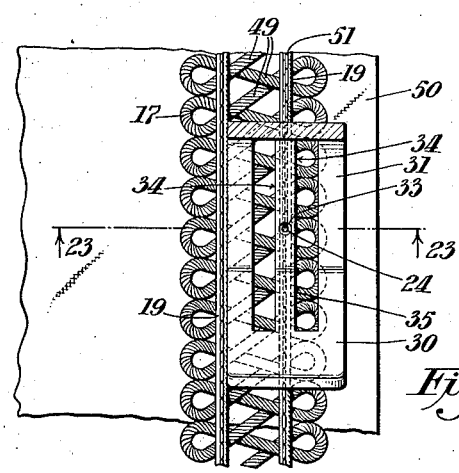
Figure 24:
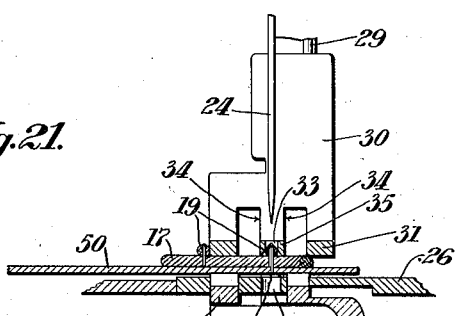

Fig. 10 is a perspective view of a special sewing machine presser-foot for use with the device. Fig. 11 is a perspective view showing the use of a loop-stripper with the device. Fig. 12 is a transverse section of the loop-stripper of Fig. 11. Fig. 13 is a side elevation of the loop-stripper of Fig. 11. Fig. 14 is a perspective view of a modified form of loop-stripper. Figs. 15 to 18, inclusive are plan views illustrating several varieties of trimmings which may be made with the device. Fig. 19 illustrates the variety of trimming shown in Fig. 16 applied as an edging to a bodyfabric. Fig. 20 illustrates the same form of trimming applied as an insertion between two pieces of body-fabric. Fig. 21 shows the form of trimming of Fig. 15, applied as an insertion. Fig. 22 is a plan view showing the first step to be followed in applying the trimming to a bodyfabric. Fig. 23 is a section on the line 23—23, Fig. 22, and Fig. 24 is a sectional view showing how the body-fabric is to be folded to show the trimming strip as an edging.

According to the preferred embodiment of the invention illustrated, there is provided a trimming strip forming frame or forked member comprising an end-member or handle 1 having a long centrally projecting prong or tongue 2 terminating at its free end in a T-head 3. Fulcrumed on the pivot-pins 4 which are fixed to the handle 1 are the side-bars or prongs 5ª, 5ᵇ each of which has the cross-sectional form of an angle-bar having a flat base-portion 5' and an upstanding toothed portion 5" at an acute angle to the base-portion, as shown in Fig. 4. The toothed upstanding portions 5" of the side-bars are spaced apart and each is spaced from the intermediate tongue 2 to provide narrow stitch-receiving gaps 6. There is pivoted at 7 to the free end of the side-bar 5ª, a distance piece 8 of U-shaped cross-section having a channel 9 which embraces or receives the ends of the sidebars, as well as the T-head of the tongue 2. The tip end 10 of the side-bar 5ᵇ projects through a hole 11 in the distance piece 8 and is thereby held in contact with one side of the T-head 3 which latter is held in contact with the other side-bar, as shown in Fig. 1. The width of the T-head 3 is such that when the distance piece 8 is closed, the tooth-rows of the side-bars are in parallelism. The distance piece 8 may be formed with one or more additional holes 12 to receive the tip-end 10 of the side-bar 5ᵇ when it is desired to adjust the side-bars to angular or tapered relationship with one-another, as shown in Fig. 2.

There is secured in flat superposed relation upon the handle 1, by the riveted shanks of the pivot-pins 4, a leaf-spring 13 which is provided with rib-forming-strand-positioning slots 14 each in line with a respective stitch-receiving gap 6, Fig. 1. The distance piece 8 also has rib-forming-strand-positioning notches 15 each cut in line with a respective one of the gaps 6. The distance piece 8 may be further provided with a notch 16 for the starting end of the trimming-base-forming-strand 17, Fig. 1 and with one or more additional notches 18, Fig. 2, for one of the rib-forming strands 19.

Referring particularly to Fig. 6, it will be seen that the upstanding portions 5″ of the side-bars are provided at equidistant intervals with vertical slots 20 to form the teeth 21 the upper ends of which have slightly beveled corners 22; the teeth 21 being substantially rectangular in form but without sharp corners or edges. The first few teeth 21′ at the starting end of the frame, remote from the handle 1, have their upper ends rounded off more than the remaining teeth 21 to more easily receive the end-loops of a previously formed and stitched length of trimming strip for continuation of the manufacture of the trimming strip to any desired length. The slots 20 extend substantially all the way down to the base portions 5′ of the respective side-bars, so that the trimming base strand 17 will, when looped upon the teeth of the frame, lie substantially in contact with the intermediate tongue 2. It will also be noticed that the flat base-portions 5′ of the side-bars lie in a common plane with the intermediate tongue 2 so that both the side-bars and tongue may rest flat upon the cloth-plate of an ordinary sewing machine with which the device is intended to be used.

The sewing machine may be of the usual family or domestic type having the needle-bar 23 carrying the needle 24 which reciprocates vertically through the needle-hole 25 in the throat-plate 26. The machine has the usual flat bed or cloth-plate 27 and four-motion feed-dog 28 which operates through the usual feed-dog slots in the throat-plate 26.

For use with the present trimming strip-forming frame, the usual spring-pressed presser-bar 29 of the sewing machine is preferably fitted with a special presser-foot 30 having a flat sole-plate 31 and upturned toe 32. The sole-plate 31 is provided in its longitudinal center line with a needle-hole 33 and on each side of its longitudinal center line with a guide slot 34 for the upturned toothed portions 5″ of one or the other of the side-bars of the trimming strip forming frame, there being between the slots 34 a narrow central bar 35 which is provided in its under face with an inverted V-shaped groove 36 adapted to guide the rib-forming strands 19, one at a time, to the needle so that the latter will stitch through and longitudinally of such strands. The slots 34 in the presser-foot are so spaced laterally of the needle-hole 33 that the rib-forming strands 19 will be guided longitudinally above the respective stitch-receiving gaps 6 in the forming frame.

To use the device for making a trimming strip with parallel edge lines, the frame is adjusted with its side-bars 5ᵃ, 5ᵇ in parallel relation, as shown in Figs. 1 and 7. A trimming base strand 17 of material is then knotted at its starting end and engaged in the starting notch 16 in the distance piece 8 remote from the handle 1. The strand 17 is then looped back and forth by hand around the teeth of the side-bars and progressively lengthwise of the latter to form the desired pattern. The substantially rectangular form of the teeth 21 and the inclination of the teeth of each row away from the teeth of the other row, are of great assistance to the operator in the hand-looping operation, as the loops may be formed upon and close to the upper ends of the teeth and readily slide down to the bases of the teeth. The rib-forming strands 19 are next placed in the notches 15 of the distance piece 8 and stretched lengthwise of the frame and slipped into the notches 14 of the spring 13 so as to overlie the legs of the loops of the base strand 17. The rib-forming strands 19 should be initially cut into lengths at least equaling the length of the trimming strip desired to be made, which may be many times the length of the forming frame. The same or different strands or cords may be used for the base and rib-forming strands. The side-bars 5ᵃ, 5ᵇ are preferably stiffened, to resist bending or deformation under the cross-strains of the looped base strand 17, by having their flat base-portions 5′ widened beam-fashion centrally of the lengths of the side-bars, as shown in Figs. 1 and 2.

When the frame has been wound as directed it is presented to a sewing machine fitted with the presser-foot 30 and a line of stitches is passed through one rib-forming strand to secure the latter to the legs of the base-strand loops. The stitching thread or threads are then cut and a second line of stitching is passed through the other rib-forming strand to secure it to the legs of the base-strand loops in parallelism with the first rib-forming strand. After both rib-forming strands have been stitched to the looped base strand the frame is removed from the machine, and the stitched length of finished trimming is stripped from the teeth of the frame.

To assist in the stripping operation there may be provided a stripper 37, Figs. 11, 12 and 13, made of two pieces of sheet-metal riveted together at 38 and having lower and upper offset portions 39, 40 spaced apart to form a passageway 41, Fig. 12, for the base-portion 5′ of the side-bar 5ᵇ. The offset portions 39, 40 of the stripper have spaced upstanding lips 42, 43, respectively, forming a passageway for the upstanding toothed portion 5″ of the side-bar 5ᵇ. Each of the lips 42, 43 has an inclined edge 44 which cams the loops of the trimming strip upwardly, Fig. 11, and dislodges them from the teeth of the side-bar 5ᵇ. The trimming strip may then be readily removed from the teeth of the other side-bar 5ᵃ. It is of course understood that the starting ends of the strands in the positioning notches of the piece 8 must be severed and the distance piece 8 opened before the stripper is applied to the side-bar 5ᵇ. The inner lip 42 of the stripper should preferably fit rather closely against the toothed upstanding portion 5″ of the frame side-bar, so as to hold the outer upstanding lip 43 of the stripper closely thereagainst in order that the inclined edge 44 of the outer lip may engage and lift the ends of the loops of the trimming strip. It may be desirable to provide the stripper with a spring tongue 45, Fig. 14, to resiliently engage the inner face of the toothed upstanding portion 5″ of the frame side-bar 5ᵇ through an opening 46 in the inner lip 42.

After the stitched portion of the trimming strip is removed from the frame, the last few loops stitched may be easily applied by hand, aided by the pointed tongue 47 of the stripper, to the specially rounded end-teeth 21' adjacent the distance piece 8, which is then closed to the position shown in Fig. 1. The hand-looping of the base strand 17 is then continued to again fill the frame, after which the rib-forming strands are drawn taut and slipped into the positioning notches 14 and under the spring 13. The stitching is again resumed at the points where it was previously stopped and continued to the handle end of the frame. There is no danger that the stitching will be carried too far since one or the other of the upstanding pivot-pins 14 will engage the upturned toe 32 of the presser-foot and arrest the feed of the frame before the needle reaches the end of the respective stitch-receiving gap 6 in the frame. The stripping, looping and stitching operations may be repeated until the trimming strip attains the desired length.

It will be observed in Fig. 8 that the rising feed-dog 28 engages the intermediate tongue 2 of the frame and lifts the latter under the downward yielding pressure of the spring-pressed presser-foot 30. It is found in practice that the frictional engagement of the feed-dog teeth with the under side of the tongue 2 exceeds that of the looped base-strand 17 with the under face of the presser-foot 30, so that the feed-dog effectively feeds the loaded frame through and under the presser-foot. Of course, the tongue 2 may, if necessary, be sand-blasted or otherwise roughened on its under face to increase the grip of the feed-dog thereagainst.

To make a tapered trimming strip, the frame is set up with the side-bars 5ᵃ, 5ᵇ inclined to one another, as shown in Fig. 2. The trimming base strand 17 is wound or looped around the teeth of the side-bars in any desired pattern and the rib-forming strands 19 are stretched longitudinally of the respective side-bars between the notches 15, 18 and slots 14 in the spring 13. The tongue 2 is then shifted into parallelism with the side-bar 5ᵇ and one intermediate rib-forming strand 19 is stitched to position across the legs of the base strand loops. When the stitching of the first rib-forming strand is completed, the side-bars are swung from full to dotted line position, Fig. 2, to shift the other side-bar 5ᵃ into parallelism with the tongue 2. The stitching of the second rib-forming strand to the looped base-strand is then proceeded with.

Figure 16:
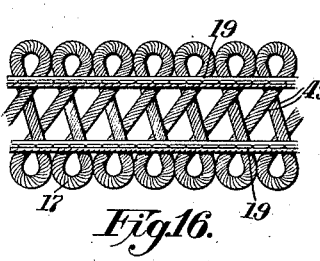

A great variety of trimmings may be produced by use of the present device. In Fig. 15 there is illustrated the "ladder" type of trimming having spaced parallel cross-bars 48. Fig. 16 illustrates the closely formed "figure 8" type of parallel trimming with the angularly related or zigzag cross-bars 49. Fig. 17 shows an open form of "figure 8" tapered trimming. The parallel type of trimming of Fig. 18 is formed by using an additional base-strand 17' which is looped onto the frame so that the legs of the loops cross the legs of the loops of the base-strand 17 to form a series of Xs between the rib-forming strands 19.

Any of the trimming strips according to the invention may be readily and accurately applied as an edging to a body-fabric by merely superposing the trimming strip upon a body fabric, and presenting the two to the sewing machine, as shown in Figs. 22 and 23, using the special presser-foot 30 to guide one of the rib-forming strands of the trimming to the needle which sews the trimming to the body-fabric 50 with a line of stitches 51. The body-fabric 50 is then folded around the line of stitches 51 to the position shown in Fig. 24 and pressed to position or additionally stitched by a line of stitches 52. Fig. 19 illustrates a face view of the edged body-fabric of Fig. 24. Obviously by repeating the operation and using an additional piece of body-fabric 50' the trimming strip may be applied as an insertion. This effect is shown in Fig. 20 in simulation of zigzag cross-bar hemstitching, and in Fig. 21 in simulation of parallel cross-bar hemstitching. Inasmuch as the trimming strip may be initially formed with strictly parallel rib-forming strands 19, and inasmuch as such strands are used to guide the subsequently formed lines of stitching 51 and 52 used to attach the trimming strip as an edging or as an insertion, it follows that a high degree of accuracy is readily attained in making insertions of uniform width or in applying edgings with uniformity.

Variously colored threads, cords, twists, yarns and the like and combinations of the same may be used in forming the base of the trimming. The rib-forming strands may be of any suitable cord or strip-like material having sufficient size or thickness and body to be guided by cooperation with a guiding element of a sewing machine.

So far as I am aware, I am the first to provide an open-work trimming strip and means for making it, whereby such trimming strip may be made up by use of an ordinary sewing machine, and when so made, has one or more ribs extending longitudinally thereof with sufficient thickness and/or body for cooperation with a sewing machine guiding element to control the position of a subsequent line of sewing machine stitches in the attachment of the trimming to a body-fabric.

The invention is not to be understood as limited to the specific forms and arrangements of parts or to the details of construction shown and described as such forms, arrangements and details are merely illustrative of one embodiment of the invention and may obviously be variously modified within the spirit and scope of the invention.

Having thus set forth the nature of the invention, what I claim herein is:—

1. A trimming strip forming frame adapted for use with a sewing machine, said frame comprising a pair of side-bars each having a row of spaced upstanding teeth, and means for holding said side-bars in laterally spaced relation, said frame having means between and spaced from said side-bars adapted for feeding engagement by the feed-dog of a sewing machine.

2. A trimming strip forming frame adapted for use with a sewing machine, said frame comprising a handle, a pair of spaced side-bars joined at one end to said handle and each having a row of spaced upstanding teeth around which a trimming-base-strand may be looped back-and-forth between the side-bars on one face only of said frame, a distance piece releasably connecting the free ends of the side-bars, and a tongue on said handle disposed between and spaced from said side-bars.

3. The combination with a sewing machine having stitch-forming mechanism including a reciprocatory needle, work-feeding mechanism including a feed-dog, and a spring-pressed presser-foot, of a trimming strip forming frame having spaced side-bars each having a row of spaced upstanding strand-loop-positioning teeth, said frame having means between said rows of teeth adapted for feeding engagement by the feed-dog as it rises under the pressure of the presser-foot.

4. The combination with a sewing machine having stitch-forming mechanism including a reciprocatory needle and feeding mechanism, of a trimming-base-strand supporting frame having spaced side-bars separated by a stitch-receiving gap, said side-bars each having a row of upstanding teeth, means for guiding said frame relative to said needle so that the latter will stitch lengthwise of and within said gap, and means for guiding a rib-forming strand in the direction of seam-formation to said needle.

5. The combination with a sewing machine having stitch-forming mechanism including a reciprocatory needle, a presser-foot, and feeding mechanism, of a trimming-base-strand supporting frame having spaced side-bars separated by a stitch-receiving gap and each formed with a row of spaced upstanding teeth, and means for guiding said frame relative to said needle so that the latter will stitch lengthwise of and within said gap, said frame having positioning means in line with said gap for a rib-forming strand, and said presser-foot having means for guiding said rib-forming strand to said needle.

6. The combination with a sewing machine having stitch-forming mechanism including a reciprocatory needle, a presser-foot, and feeding mechanism, of a trimming-base-strand supporting frame having spaced side-bars separated by a stitch-receiving gap, said side-bars being each formed with a row of spaced upstanding teeth, said presser-foot having a guide-slot providing spaced walls engaging sides of a row of said teeth for automatically guiding said frame relative to said needle so that the latter will stitch longitudinally of and within said gap.

7. The combination with a sewing machine having stitch-forming mechanism including a reciprocatory needle, a presser-foot and feeding mechanism, of a trimming-base-strand supporting frame having spaced side-bars separated by a stitch-receiving gap, said side-bars being each formed with a row of spaced upstanding teeth, said presser-foot and frame having coacting means for guiding said frame relative to said needle so that the latter will stitch longitudinally of and within said gap, and positioning means on said frame in line with said gap for locating a rib-forming strand in predetermined sewing position above and parallel to said gap.

8. A trimming strip forming frame adapted for use with a sewing machine, said frame comprising a pair of laterally spaced side-bars each having a row of spaced upstanding strand-loop-positioning teeth, and an intermediate tongue extending lengthwise of and between said side-bars and spaced from the latter to provide sewing machine stitch-receiving gaps adjacent and within the respective side-bars.

9. A trimming strip forming frame adapted for use with a sewing machine, said frame comprising a pair of angle-bars each having a flat base-portion and an upstanding portion at an acute angle to said base-portion, said upstanding portion having therein a row of teeth, and means for holding said angle-bars in laterally spaced relation with their toothed upstanding portions disposed inwardly of their base-portion.

10. A trimming strip forming frame adapted for use with a sewing machine, said frame comprising a pair of angle-bars each having a flat base-portion and an upstanding portion at an angle to said base-portion, said upstanding portion having therein slots extending downwardly substantially to the base-portion and defining strand-loop-positioning teeth.

11. A trimming strip forming frame adapted for use with a sewing machine, said frame comprising a tongue, a pair of side-bars each connected at one end to said tongue and each having a row of spaced upstanding strand-loop-positioning teeth, and a distance piece releasably connecting the free ends of said side-bars.

12. A trimming strip forming frame adapted for use with a sewing machine, said frame comprising a tongue, a pair of side-bars each pivotally connected at one end to said tongue and each having a row of spaced upstanding strand-loop-positioning teeth, and a distance piece having means for releasably connecting the free ends of said side-bars in a plurality of differently spaced relative positions.

13. A trimming strip forming frame adapted for use with a sewing machine, said frame comprising a flat supporting tongue, a pair of toothed side-bars each spaced from a respective side edge of said tongue to form a stitch-receiving gap, means pivotally connecting said side-bars to said tongue adjacent one end of the latter, and a distance piece releasably connecting the side-bars and tongue at the other end of said tongue.

14. A trimming strip forming frame adapted for use with a sewing machine, said frame comprising a flat supporting tongue, a pair of toothed side-bars each spaced from a respective side edge of said tongue to form a stitch-receiving gap, means pivotally connecting said side-bars to said tongue adjacent one end of the latter, a distance piece releasably connecting the side-bars at the other end of said tongue, and means for positioning and holding rib-forming strands longitudinally of and over said stitch-receiving gaps.

15. A trimming strip forming frame adapted for use with a sewing machine, said frame comprising a flat supporting tongue, a pair of toothed side-bars each spaced from a respective side edge of said tongue to form a stitch-receiving gap, means pivotally connecting said side-bars to said tongue adjacent one end of the latter, a distance piece releasably connecting the side-bars at the other end of said tongue, and means for positioning and holding rib-forming strands longitudinally of and over said stitch-receiving gaps, said pivotal means each having a positioning head for a rib-forming strand adapted to maintain the rib-forming strand in parallelism with its respective side-bar for any relative angular relationship of the side-bars.

16. A trimming strip forming frame adapted for use with a sewing machine, said frame comprising a pair of spaced side-bars each having a row of teeth around which teeth a trimming-base-strand may be looped back-and-forth between the side-bars on one face only of said frame, means for holding said side-bars in laterally spaced relation, and a loop-stripper having a passageway therethrough to slidably embrace one of said side-bars and guide said loop-stripper relative to the teeth of the latter, said loop-stripper having an inclined loop-stripping edge.

17. A trimming strip forming frame adapted for use with a sewing machine, said frame comprising a pair of spaced side-bars each having a row of teeth around which teeth a trimming-base-strand may be looped back-and-forth between the side-bars on one face only of said frame, means for holding said side-bars in laterally spaced relation, and a loop-stripper having a passageway therethrough to slidably embrace one of said side-bars and guide said loop-stripper relative to the teeth of the latter, said loop-stripper having an inclined loop-stripping edge disposed between said rows of teeth.

18. The combination with a work-holding frame having a row of spaced upstanding teeth, of a sewing machine presser-foot having a sole-piece formed with a guiding slot for the row of teeth of said work-holding frame, said sole-piece having a cord-guiding groove in its under face closely adjacent and parallel to said slot.

19. The combination with a work-holding frame, of a sewing machine presser-foot having a sole-piece formed with spaced guiding slots for said work-holding frame, said slots extending longitudinally of said sole-piece, said sole-piece having a bar intermediate said slots formed with a needle-opening and with a cord-guiding groove in its under face.

20. A trimming strip forming frame adapted for use with a sewing machine, said frame comprising a pair of spaced base-strand-loop-positioning side-bars separated by a tongue providing stitch-receiving gaps, and guiding means in line with said gaps for holding rib-forming strands in predetermined sewing position above and longitudinally of said gaps.

21. A loop-forming frame adapted for use with a sewing machine, said frame comprising a pair of spaced side-bars each having a row of loop-positioning teeth and an intermediate tongue extending lengthwise of and spaced from said side-bars to provide stitch-receiving gaps.

JOHN D. KARLE.